United States Patent
Williams

(10) Patent No.: US 11,498,223 B2
(45) Date of Patent: Nov. 15, 2022

(54) APPARATUS CONTROL SYSTEMS AND METHOD

(71) Applicant: Sony Interactive Entertainment Inc., Tokyo (JP)

(72) Inventor: Nigel John Williams, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 437 days.

(21) Appl. No.: 16/401,221

(22) Filed: May 2, 2019

(65) Prior Publication Data

US 2019/0344449 A1 Nov. 14, 2019

(30) Foreign Application Priority Data

May 9, 2018 (GB) ...................................... 1807561

(51) Int. Cl.
*B25J 11/00* (2006.01)
*B25J 9/16* (2006.01)
(Continued)

(52) U.S. Cl.
CPC ........... *B25J 11/003* (2013.01); *A63F 13/803* (2014.09); *B25J 9/1605* (2013.01); *B25J 9/1656* (2013.01);
(Continued)

(58) Field of Classification Search
CPC ...... B25J 11/003; B25J 9/1605; B25J 9/1656; B25J 9/1671; A63F 13/803; A63F 13/23; A63F 2300/1025; A63F 2300/8017; A63F 13/00; A63F 2300/69; G05B 2219/50391; G06N 3/08; G06N 5/046; G06N 3/008; G06T 19/006; A63H 11/00; A63H 13/00; A63H 17/00; A63H 30/00; A63H 2200/00; Y10S 901/00
See application file for complete search history.

(56) References Cited

U.S. PATENT DOCUMENTS 9,880,553 B1 1/2018 Hoffman
2009/0088884 A1\* 4/2009 Yuan ................. G05B 19/41885
700/110
(Continued)

FOREIGN PATENT DOCUMENTS

EP 1215551 A1 6/2002

OTHER PUBLICATIONS

Combined Search and Examination Report for corresponding GB Application No. GB1807561.4, 4 pages, dated Oct. 22, 2018.
(Continued)

*Primary Examiner* — Basil T. Jos
(74) *Attorney, Agent, or Firm* — Matthew B. Dernier, Esq.

(57) ABSTRACT

A system for controlling interactions between a plurality of real and virtual robots, includes one or more real robots present in the real environment, one or more virtual robots present in a virtual environment corresponding to the real environment, and a processing device operable to control interactions between one or more of the real robots and one or more of the virtual robots, where the interactions between the real and virtual robots are dependent upon at least the positions of the one or more real robots in the real environment and the positions of the one or more virtual robots in the virtual environment.

14 Claims, 8 Drawing Sheets

(51) Int. Cl.
*A63F 13/803* (2014.01)
*A63F 13/23* (2014.01)

(52) U.S. Cl.
CPC ....... *A63F 13/23* (2014.09); *A63F 2300/1025* (2013.01); *A63F 2300/8017* (2013.01); *G05B 2219/50391* (2013.01)

(56) References Cited

U.S. PATENT DOCUMENTS

| | | | | |
|---|---|---|---|---|
| 2015/0217449 | A1* | 8/2015 | Meier | G05B 13/027 700/257 |
| 2015/0273685 | A1 | 10/2015 | Linnell | |
| 2016/0257000 | A1* | 9/2016 | Guerin | B25J 9/1605 |
| 2018/0117762 | A1 | 5/2018 | Earwood | |

OTHER PUBLICATIONS

Communication pursuant to Article 94(3) corresponding to EP Application No. 19170255.4, 6 pages, dated Feb. 22, 2021.
Extended European Search Report for corresponding EP Application No. 19170255.4, 11 pages, dated Sep. 2019.
Zhu Jinhui et al: "A component-based hybrid testbed for multi-mobile robots" Information and Automation. 2009. ICIA '09. International Conference . IEEE. Piscataway. NJ. USA., pp. 905-909, Jun. 22, 2009.
Kuroda Y et al: "A Hybrid Environment for the Development of Underwater Mechatronic Systems" Proceedings of the 1995 IEEE IECON: I: International Conference on Industrial Electronics, Control, and Instrumentation. Orlando, Nov. 6-10, 1995. Plenary Session. Invited Sessions and Power Electronics; vol. 1., pp. 173-178, Nov. 6, 1995.
Min Xin et al: "Sheep and wolves" Conference on Human Factors in Computing Systems Archive. CHI '06 Extended Abstracts on Human Factors in Computing Systems. ACM. US. pp. 1553-1558, Apr. 21, 2006.
Abraham Prieto Garcia et al: "Educational autonomous robotics setup using mixed reality" Next Generation Web Services Practices (NWESP). 2011 7th International Conference on. IEEE., pp. 452-457, Oct. 19, 2011.
Gatzoulis C et al: "Adaptive Social Skills for Robots Interacting with Virtual Characters in Real Worlds" Robot and Human Interactive Communication, Roman 2006. The 15th IEEE International Symposium on. IEEE. PI. pp. 8-13, Sep. 1, 2006.

* cited by examiner

APPARATUS CONTROL SYSTEMS AND METHOD

BACKGROUND OF THE INVENTION

Field of the Invention

This disclosure relates to an apparatus control system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The use of robots as entertainment devices has become increasingly widespread with advances in available technology. Robots may be desirable in such a context in that they may provide physical interactions and feedback that offer a more intuitive and interactive entertainment experience than a virtual entertainment experience. In some examples, robots may be used with a games console or other processing device in order to enhance an interactive gaming experience or the like.

One example of such a robot is the Sony® Aibo; this is a robotic canine companion that is operable to interact with a user in a number of ways. While earlier versions of the Aibo had significant functionality, the newest versions are even more capable of providing user interaction. However, with this increase in functionality may come an increase in cost—meaning that a user is often limited to owning a single robot and therefore opportunities for more complex interactions may be limited.

At the other end of the spectrum, there are numerous examples of other available robots that offer only basic functionality (such as random motion and/or basic object avoidance). These robots may not be programmable, or may only have basic functions (such as backward/forwards/left/right motion) that may be controlled. These may be cheap for a consumer to purchase, but due to their limited functionality the opportunity for meaningful interactions with a user are limited. Such devices may therefore be undesirable, despite a user being able to obtain a larger number of such devices.

It is therefore desirable to provide an arrangement in which low-cost robots may be provided that are operable to provide an engaging and interactive entertainment experience for a user.

It is in the context of the above problems that the present invention arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
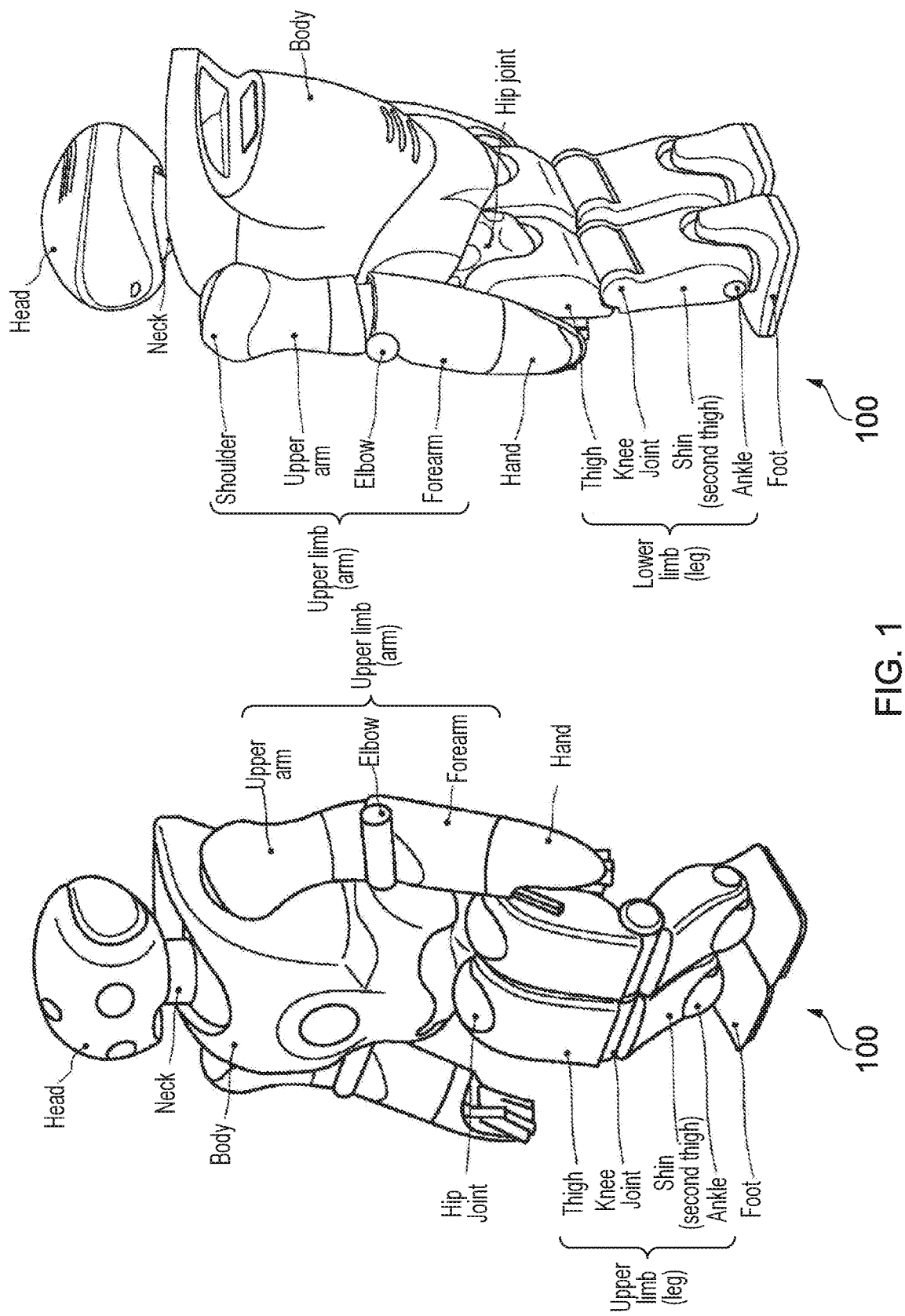
FIG. 1 is a schematic diagram showing front and rear elevations of a robot, in accordance with embodiments of the present invention.

Referring now to the drawings, wherein like reference numerals designate identical or corresponding parts throughout the several views, a robot platform 100 for implementing embodiments of the present invention may take the form of any suitable robotic device, or simulation of a robotic device, as applicable.

The robot platform may have any suitable physical features. Hence movement, where required, may be achieved by wheels, tracks, articulated limbs, internal mass displacement or any other suitable means. Manipulation, where required, may be achieved by one or more of a mechanical hand, pincer or any other hooking or gripping system, such as a suction or electromagnetic attachment mechanism or a hook or clip, and any further optional articulation such as one or more jointed arms. Vision, where required, may be achieved by optical camera and/or infra-red camera/detector, mounted on the robot and/or located within the environment navigated by the robot. Other situational awareness systems such as ultrasound echolocation, or detection of metal tracks and/or electrically charged tracks, and proximity systems such as whiskers coupled to sensors, or pressure pads, may also be considered. Control of the robot may be provided by running suitable software instructions on a processor of the robot and/or a processor of a remote computer communicating with the robot, for example via a wireless protocol.

FIG. 1 illustrates front and rear views of an exemplary legged locomotive robot platform 100. As shown, the robot includes a body, head, right and left upper limbs, and right and left lower limbs for legged movement. A control unit 80 (not shown in FIG. 1) within the body provides a control system for the robot.

Each of the right and left lower limbs includes a thigh, knee joint, second thigh (calf/shin), ankle and foot. The lower limb is coupled by a hip joint to the bottom of the trunk. Each of the right and left upper limb includes an upper arm, elbow joint and forearm. The upper limb is coupled by a shoulder joint to each upper edge of the trunk. Meanwhile, the head is coupled by a neck joint near to the upper end centre of the trunk.

Figure 2:
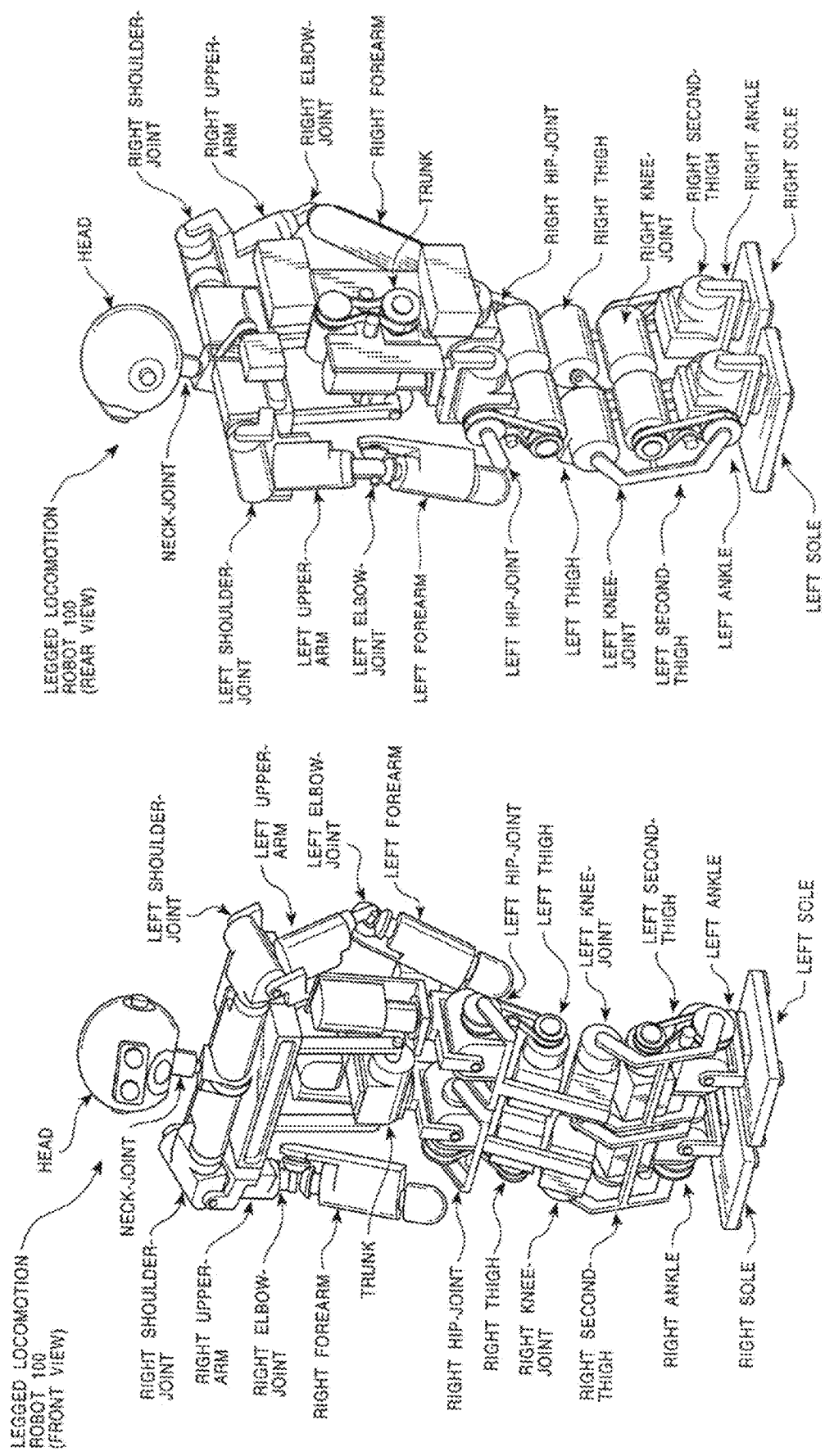
FIG. 2 is a schematic diagram showing front and rear elevations of points of articulation of a robot, in accordance with embodiments of the present invention.

FIG. 2 illustrates front and rear views of the robot, showing its points of articulation (other than the hands).

Figure 3:
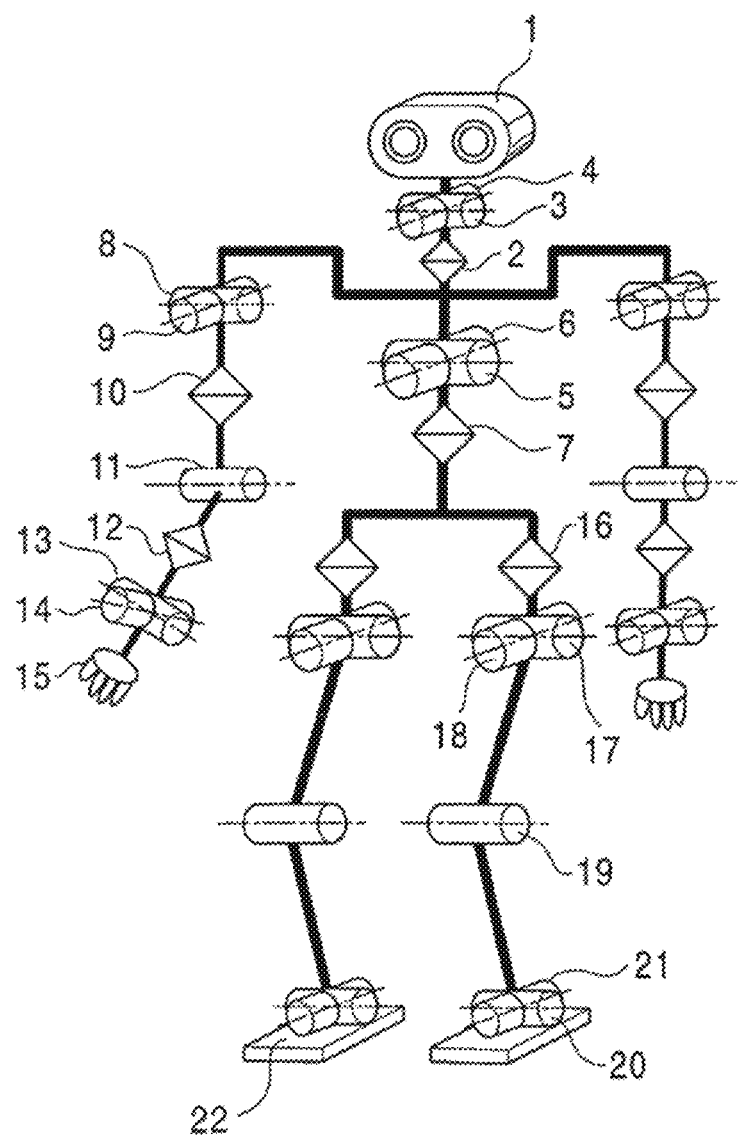
FIG. 3 is a schematic diagram illustrating degrees of freedom at respective points of articulation of a robot, in accordance with embodiments of the present invention.

FIG. 3 then illustrates the degrees of freedom available for each point of articulation.

Referring to these Figures, a neck joint for supporting the head 1 has 3 degrees of freedom: a neck-joint yaw-axis 2, a neck-joint pitch-axis 3, and a neck-joint roll-axis 4. Meanwhile each arm has 7 degrees of freedom; a shoulder-joint pitch-axis 8, a shoulder-joint roll-axis 9, an upper-arm yaw-axis 10, an elbow-joint pitch-axis 11, a forearm yaw-axis 12, a wrist-joint pitch-axis 13, a wrist-joint roll-axis 14, and a hand 15. Typically the hand 15 also has a multi-joints multi-degrees-of-freedom structure including a plurality of fingers. However, these are omitted for simplicity of explanation. The trunk has 3 degrees of freedom; a trunk pitch-axis 5, a trunk roll-axis 6, and a trunk yaw-axis 7. Each leg constituting the lower limbs has 6 degrees of freedom; a hip-joint yaw-axis 16, a hip-joint pitch-axis 17, a hip-joint roll-axis 18, a knee-joint pitch-axis 19, an ankle-joint pitch-axis 20, an ankle-joint roll-axis 21, and a foot 22. In the exemplary robot platform, the cross point between the hip-joint pitch-axis 17 and the hip-joint roll-axis 18 defines a hip-joint location of the legged walking robot 100 according to the embodiment. Again for simplicity it is assumed that the foot itself has no degrees of freedom, but of course this is non-limiting. As a result the exemplary robot 100 has 32 (=3+7×2+3+6×2) degrees of freedom in total. It will be appreciated however that this is merely exemplary, and other robot platforms may have more or fewer degrees of freedom.

Each degree of freedom of the exemplary legged locomotive robot platform 100 is implemented by using an actuator. For example, a small AC servo actuator that is directly coupled to a gear and that houses a one-chip servo-system may be used, although any suitable actuator may be considered, such as a linear servo, electroactive polymer muscle, pneumatic, piezoelectric, or the like.

It will be appreciated that any desired action that the robot platform is capable of may be implemented by control signals issued by a control system to one or more of the actuators of the robot (or to simulated actuators in a simulation, as applicable), to adjust the pose of the robot within its available degrees of freedom.

Figure 4:
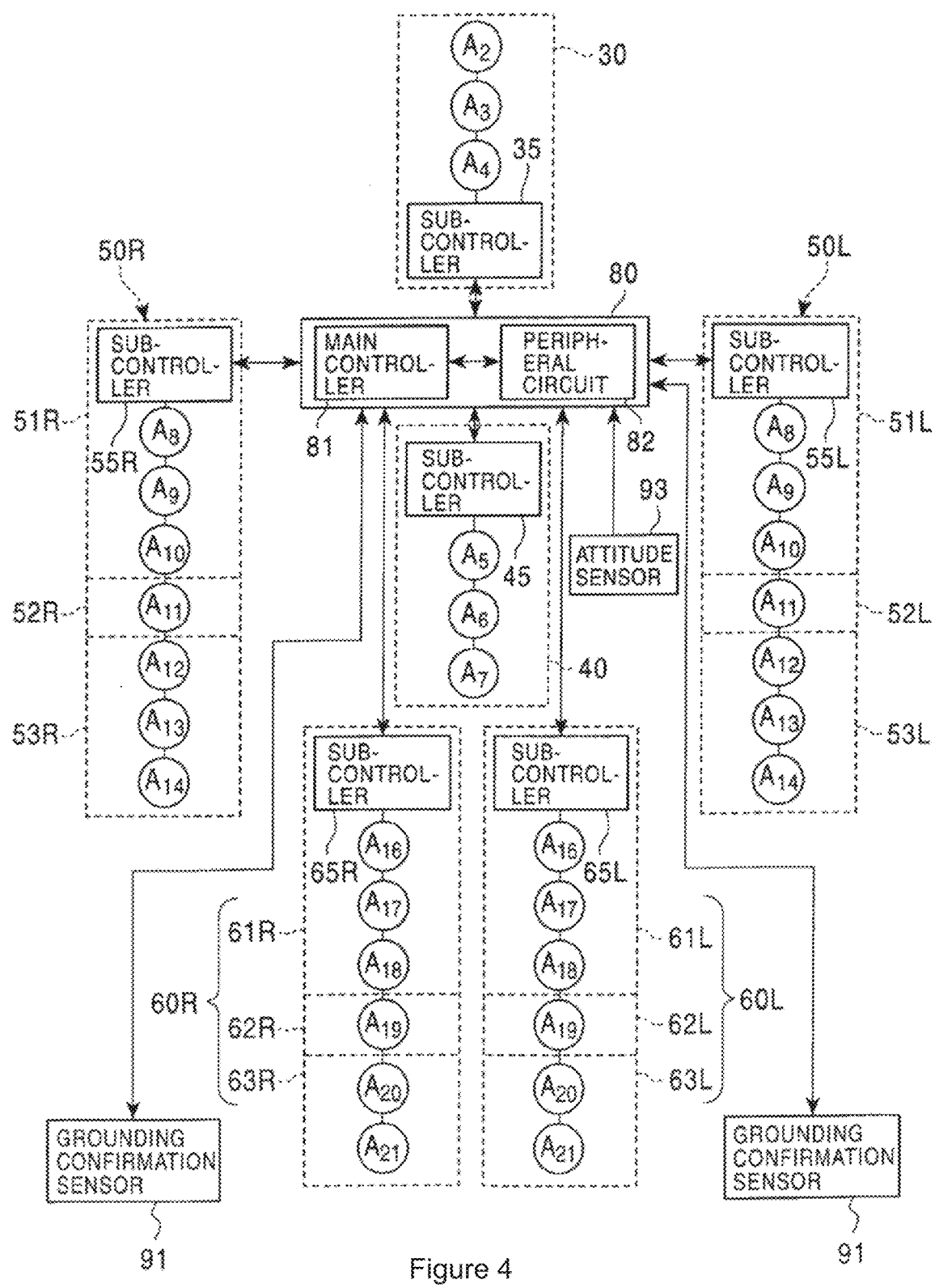
FIG. 4 is a schematic diagram of a control system for a robot, in accordance with embodiments of the present invention.

FIG. 4 schematically illustrates an exemplary control system for the robot platform 100.

A control unit 80 operates to co-ordinate the overall motion/actions of the robot. The control unit 80 has a main control unit 81 including main circuit components (not shown) such as a CPU (central processing unit) and a memory, and typically a periphery circuit 82 including an interface (not shown) for sending and receiving data and/or commands to and from a power supply circuit (not shown) and each component of the robot. The control unit may comprise a communication interface and communication device for receiving data and/or commands by remote-controlling. The control unit can be located anywhere suitable within the robot.

As shown in FIG. 4, the robot has logical units 30 (head), 40 (torso), and 50R/L and 60R/L each representing the corresponding one of four human limbs. The degrees-of-freedom of the robot 100 shown in FIG. 3 are implemented by the corresponding actuator within each unit. Hence the head unit 30 has a neck-joint yaw-axis actuator A2, a neck-joint pitch-axis actuator A3, and a neck-joint roll-axis actuator A4 disposed therein for representing the neck-joint yaw-axis 2, the neck-joint pitch-axis 3, and the neck-joint roll-axis 4, respectively. Meanwhile the trunk unit 40 has a trunk pitch-axis actuator A5, a trunk roll-axis actuator A6, and a trunk yaw-axis actuator A7 disposed therein for representing the trunk pitch-axis 5, the trunk roll-axis 6, and the trunk yaw-axis 7, respectively. Similarly the arm units 50R/L are broken down into upper-arm units 51R/L, elbow-joint units 52R/L, and forearm units 53R/L. Each of the arm units 50R/L has a shoulder-joint pitch-axis actuator A8, a shoulder-joint roll-axis actuator A9, an upper-arm yaw-axis actuator A10, an elbow-joint pitch-axis actuator A11, an elbow-joint roll-axis actuator A12, a wrist-joint pitch-axis actuator A13, and a wrist-joint roll-axis actuator A14 disposed therein for representing the shoulder-joint pitch-axis 8, the shoulder-joint roll-axis 9, the upper-arm yaw-axis 10, the elbow-joint pitch-axis 11, an elbow-joint roll-axis 12, the wrist-joint pitch-axis 13, and the wrist-joint roll-axis 14, respectively. Finally the leg units 60R/L are broken down into thigh units 61R/L, knee units 62R/L, and second-thigh units 63R/L. Each of the leg units 60 R/L has a hip-joint yaw-axis actuator A16, a hip-joint pitch-axis actuator A17, a hip-joint roll-axis actuator A18, a knee-joint pitch-axis actuator A19, an ankle-joint pitch-axis actuator A20, and an ankle-joint roll-axis actuator A21 disposed therein for representing the hip-joint yaw-axis 16, the hip-joint pitch-axis 17, the hip-joint roll-axis 18, the knee-joint pitch-axis 19, the ankle-joint pitch-axis 20, and the ankle-joint roll-axis 21, respectively. Optionally the head unit 30, the trunk unit 40, the arm units 50, and the leg units 60 may have sub-controllers 35, 45, 55, and 65 for driving the corresponding actuators disposed therein.

Hence by issuing appropriate commands, the main controller (81) can control the driving of the joint actuators included in the robot 100 to implement the desired action. For example, the controller may implement a walking action by implementing successive phases, as follows:

(1) Single support phase (left leg) with the right leg off the walking surface;
(2) Double support phase with the right foot touching the walking surface;
(3) Single support phase (right leg) with the left leg off the walking surface; and
(4) Double support phase with the left foot touching the walking surface.

Each phase in turn comprises the control of a plurality of actuators, both within the relevant leg and potentially elsewhere in the robot, for example moving the opposing arm and/or attitude of the torso to maintain the centre of gravity of the robot over the supporting foot or feet.

Optionally, to detect the manner and/or extent of a physical interaction with an object and/or the environment, physical sensors may be provided.

Hence in the exemplary robot, the feet 22 have grounding detection sensors 91 and 92 (e.g. a proximity sensor or microswitch) for detecting the grounding of the feet 22 mounted on legs 60R and 60L respectively, and the torso is provided with an attitude sensor 93 (e.g. an acceleration sensor and/or a gyro-sensor) for measuring the trunk attitude. Outputs of the grounding detection sensors 91 and 92 are used to determine whether each of the right and left legs is in a standing state or a swinging state during the walking action, whilst an output of the attitude sensor 93 is used to detect an inclination and an attitude of the trunk. Other sensors may also be provided, for example on a gripping component of the robot, to detect that an object is being held.

The robot may also be equipped with sensors to provide additional senses. Hence for example the robot may be equipped with one or more cameras, enabling the control unit (or a remote system to which sensor-based data is sent) to recognise a user of the robot, or a target object for retrieval. Similarly one or more microphones may be provided to enable voice control or interaction by a user. Any other suitable sensor may be provided, according to the robot's intended purpose. For example, a security robot intended to patrol a property may include heat and smoke sensors, and GPS.

Hence more generally, a robot platform may comprise any suitable form factor and comprise those degrees of freedom necessary to perform an intended task or tasks, achieved by the use of corresponding actuators that respond to control signals from a local or remote controller that in turn operates under suitable software instruction to generate a series of control signals corresponding to a performance of the intended task(s).

In order to provide software instruction to generate such control signals, a robot software development system may be provided for developing control sequences for desired actions, and/or for developing decision making logic to enable the robot control system to respond to user commands and/or environmental features.

As part of this development system, a virtual robot (i.e. a simulation) may be used in order to simplify the process of implementing test software (for example by avoiding the need to embed test software within robot hardware that may not have simple user-serviceable parts, or to simulate an environment or action where a mistake in the software could damage a real robot). The virtual robot may be characterised by the dimensions and degrees of freedom of the robot, etc., and an interpreter or API operable to respond to control signals to adjust the state of the virtual robot accordingly.

Control software and/or scripts to use with such software may then be developed using, and to use, any suitable techniques, including rule based/procedural methods, and/or machine learning/neural network based methods.

Figure 5:
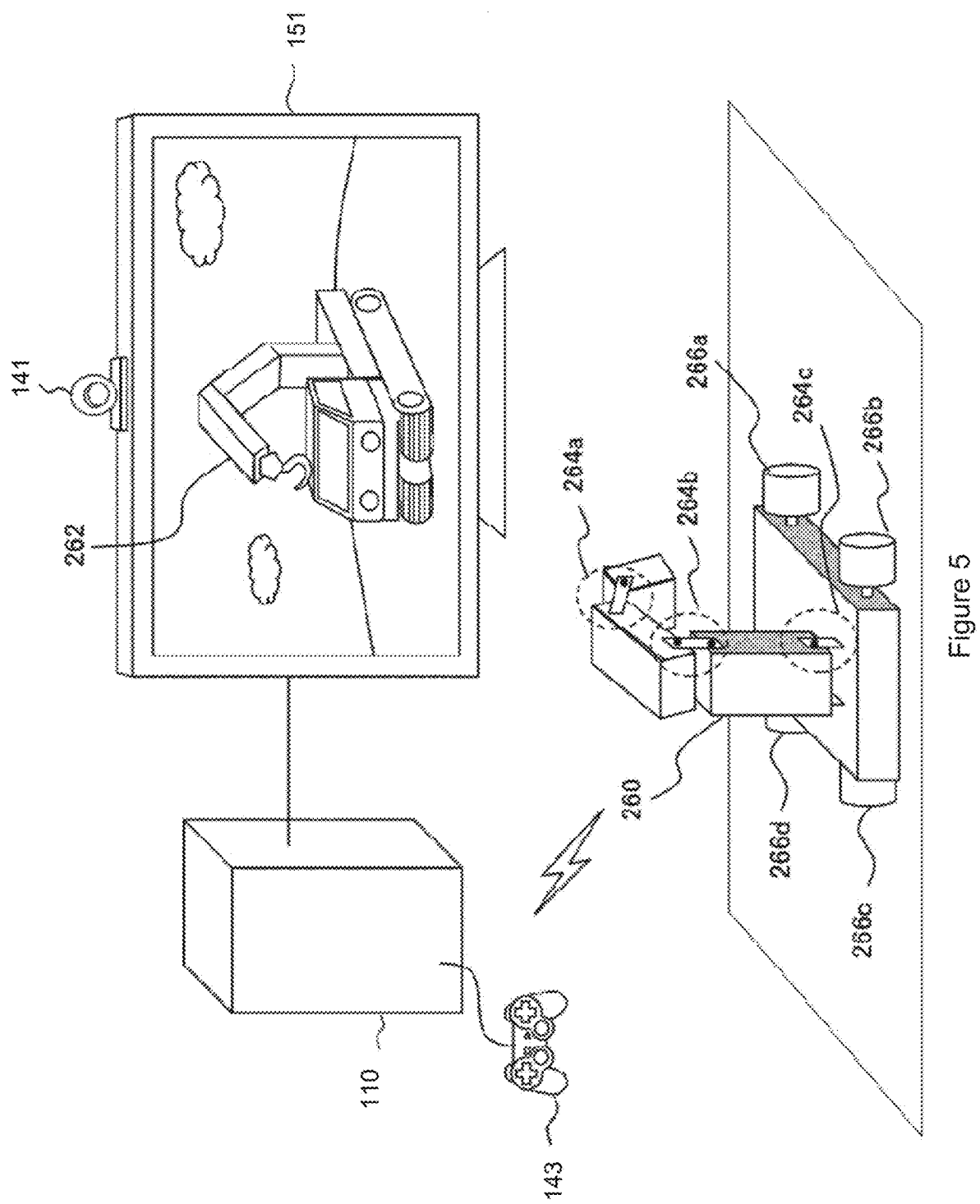
FIG. 5 is a schematic diagram of an interactive robot system in accordance with embodiments of the present invention.

Referring to FIG. 5, in an exemplary usage scenario a (toy) real robot crane 260 and a corresponding simulation (virtual robot crane 262) interact for entertainment purposes, for example mirroring each other's actions or behaving in a complementary manner, and/or using sensor data from the real or virtual robot to control actions of the other. The virtual robot may be graphically embellished compared to the real robot, for example having a face, or resembling an object or creature only approximated by the real robot.

In this example, the robot platform 260 has motorised wheels 266a-d and one articulated arm with actuators 264a-c. However it will be appreciated that any suitable form factor may be chosen, such as for example the humanoid robot 100 of FIG. 1, or a dog-shaped robot (not shown) or a spheroidal robot (not shown).

In FIG. 5, control of both the virtual and real robots is performed by a general purpose computer (110) operating under suitable software instructions, such as the Sony® PlayStation 4®. A user can interact with the PlayStation and hence optionally indirectly interact with one or both of the real and virtual robots using any suitable interface, such as a videogame controller 143. The PlayStation can detect the state of the real robot by receiving telemetry and other status data from the robot, and/or from analysis of an image of the real robot captured by a video camera 141. Alternatively or in addition the PlayStation can assume the state of the real robot based on expected outcomes of the commands sent to it. Hence for example, the PlayStation may analyse captured images of the real robot in expected final poses to determine its positon and orientation, but assume the state of the robot during intermediate states such as transitions between poses.

In the example scenario, the user provides inputs to control the real robot via the PlayStation (for example indicating an amount and direction of travel with one joystick, and a vertical and horizontal position of the arm end with another joystick). These inputs are interpreted by the PlayStation into control signals for the robot. Meanwhile the virtual simulation of the robot may also be controlled in a corresponding or complementary manner using the simulation technique described above, according to the mode of play.

Alternatively or in addition, the user may directly control the real robot via its own interface or by direct manipulation, and the state of the robot may be detected by the PlayStation (e.g. via image analysis and/or telemetry data from the robot as described previously) and used to set a corresponding state of the virtual robot.

It will be appreciated that the virtual robot may not be displayed at all, but may merely act as a proxy for the real robot within a virtual environment. Hence for example the image of the real robot may be extracted from a captured video image and embedded within a generated virtual environment in an augmented reality application, and then actions of the real robot can be made to appear to have an effect in the virtual environment by virtue of those interactions occurring with a corresponding virtual robot in the environment mirroring the state of the real robot.

Alternatively, a virtual robot may not be used at all, and the PlayStation may simply provide control and/or state analysis for the real robot. Hence for example the PlayStation may monitor the robot via the camera, and cause it to pick up a ball or other target object placed within the camera's field of view by the user.

Hence more generally, a robot platform may interact with a general purpose computer such as the Sony® PlayStation 4® to obtain a series of control signals relating to setting a state of the robot, for the purposes of control by a user and/or control by the PlayStation to achieve a predetermined task or goal. Optionally the state, task or goal may be at least in part defined within or in response to a virtual environment, and may make use of a simulation of the robot.

While the above description has referred largely to humanoid robots, other forms may be desirable. For example, it may be preferable to use a simplified form comprising a small number of actuatable components; this may reduce the cost of manufacture, for example, whilst still being able to perform a useful number of functions.

Figure 6:
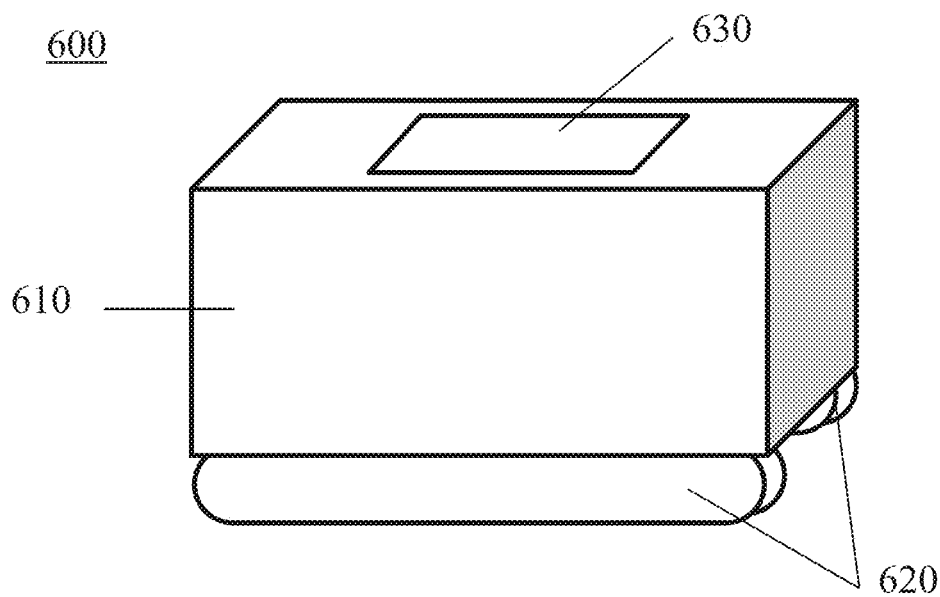
FIG. 6 schematically illustrates a simplified robot.

FIG. 6 schematically illustrates a simple robot that may be used in embodiments of the present disclosure. The robot 600 comprises a body 610, continuous tracks (caterpillar tracks) 620 and a marker 630.

The body 610 acts as a housing for any processing and/or communication circuitry that is used by the robot 600. For example, a microprocessor, memory, and wireless transceiver could all be provided within the body 610 so as to enable the robot 600 to receive and implement instructions from an external processing device (such as a computer or games console) as well as transmitting information to that device (for example, about the motion of the robot 600).

The body 610 is shown to be a cuboid in FIG. 6, however any suitable shape may be used—for example, the shape of the body 610 may be selected so as to mimic an in-game character for a related game or the like. Alternatively, or in addition, the shape of the body 610 may be selected so as to assist a user in distinguishing robots 600 from one another.

In some embodiments, the body 610 may be able to change shape (for example, using actuatable panels).

The continuous tracks 620 are an example of a suitable component for providing motion to the robot 600. Of course, any suitable arrangement that enables at least forward motion and rotation may be used—although it may be advantageous to provide components that allow motion in the backwards and left/right directions to reduce the time spent rotating. Other examples of suitable motion-providing components are wheels, movable legs, and rotatable spheres.

The marker 630 may be provided so as to assist with tracking the robot 630; any suitable pattern may be used. Alternatives to the marker 630 may be used to assist with tracking, for example object recognition techniques, localisation using wireless communications, or the use of hardware motion detectors (such as accelerometers or gyroscopes) to track motion of the robot 600.

While the robot 600 of FIG. 6 shows a suitable device to be used in arrangements according to the present disclosure, a number of additional features may be provided individually or in combination. In arrangements in which multiple robots are provided, the provided robots may have different functionality to one another so as to provide a greater number of available functions than would be provided by a set in which all robots have the same functions.

In some embodiments, a robot may be provided with an imaging device so as to be able to capture an image of the environment. For example, an infra-red camera may be used to assist with navigation of the robot. Alternatively, or in addition, a visible-light camera may be provided that is operable to provide an image of the environment that may be viewed by a user. Images captured may be used to provide mapping data, for example using SLAM (Simultaneous Localisation And Mapping) techniques or any other method. This mapping may be performed in conjunction with other processes, such as using images of the environment 700 captured using the camera 770. These are examples of embodiments in which one or more of the real robots comprises a camera operable to capture images of the real environment. The phrase 'real environment' is used here to differentiate between the physical environment in which the robots 600 are present, and a virtual environment (such as a game environment) generated for use with the robots 600.

In some embodiments, additional communication circuitry may be provided so as to allow robots to communicate with one another and/or identify each other. This communication may also comprise identifying the relative positions of the robots, in some examples. A low-power short-range communication protocol may be a particularly suitable example, so as to reduce the power requirements of each robot, although any communication methods may be utilised.

In some embodiments, the robot 600 may be provided with a display element that is operable to communicate information to a user. For example, an LED could be provided that signifies an operation state (such as 'active' or 'inactive'). Alternatively, or in addition, a more advanced display may be provided that is operable to display information relevant to a game state or the like—for example, hit points assigned to the robot 600 (or a corresponding virtual object) or events that are occurring. An LCD display may also (or instead) be provided so as to provide high-quality visual feedback to a user in some embodiments.

One or more of the robots 600 may also be provided with components to enable the generation or reception of electrical energy; for example, solar panels or inductive charging loops may be provided that would enable the robot to be recharged during use, or to forego the provision of a battery or other power source altogether. Such charging methods may be particularly advantageous in the case that a large number of robots 600 are used, so as to reduce the burden on the user of plugging them in individually. For example, a storage container may be provided that is operable to provide inductive charging for the robots 600 when they are not in use.

As noted above, more complex robots may be used that offer any range of functionality (such as humanoid robots discussed above); the present disclosure is not limited to simplified robots of the form described with reference to FIG. 6.

Figure 7:
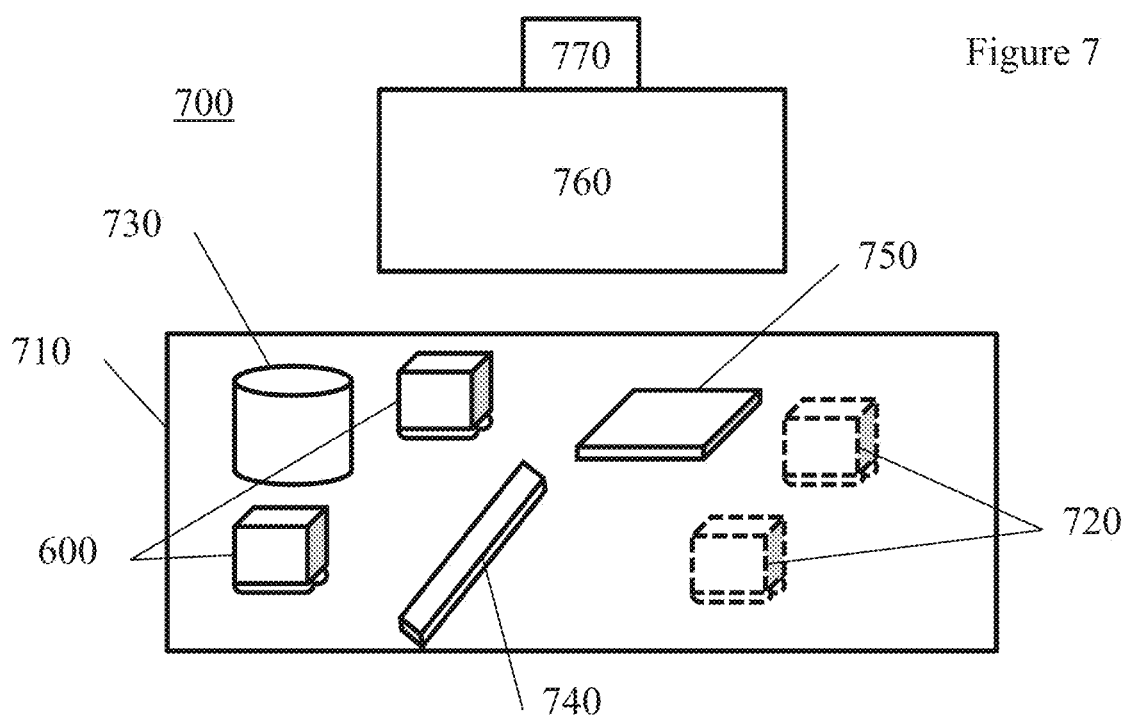
FIG. 7 schematically illustrates an interaction environment.

FIG. 7 schematically illustrates an environment 700 in which robots according to the present disclosure may be used. The environment 700 comprises at least an interaction area 710, and may also comprise a display 760 and camera 770. A processing device (not shown) may also be provided that is operable to provide control signals to the robots 600, track the location of the robots 600, perform game-/application-related processing, and/or control the display of content on the display 760.

The interaction area 710 may comprise a well-defined physical mat or marked out area in which the robots 600 are to be used, although it is not necessary that physical boundaries are well-defined. In some embodiments, the interaction area 710 may comprise an inductive charging mat such that robots may be provided with a source of energy during use; this is an example of the real environment comprising an inductive charging loop operable to provide electrical power to the real robots.

Also shown in the environment 700 are virtual robots 720. These may be displayed using a projector so as to enable a real-world viewing of the robots 720 (or a two-dimensional approximation of the robots 720); alternatively, the robots 720 may only be visible on the display 760 associated with the environment 700. Such robots 720 are provided so as to be able to interact with the robots 600, and as such it is considered that each of the real objects (such as robots 600) is also present in a virtual environment that corresponds to the real environment 700; this will be discussed in more detail below.

A plurality of obstacles 730, 740 and 750 are shown in the interaction area 710. While it is envisaged that each of these obstacles is a real-world object, it is possible that the obstacles are only present in the virtual environment associated with the environment 700. By using the real-world objects as obstacles, a user is able to design an environment in which the robot interactions are to take place—for example, by defining a map or playing field with a desired terrain. Alternatively, or in addition, virtual obstacles may be defined in the virtual environment and the real robots 600 may be controlled as if the virtual obstacles were also present in the real environment.

The obstacle 730 is a large obstacle that may prevent the robots 600 from taking a particular path, and due to its size it may be recognised as such. In the case that one or more of the robots 600 are equipped with cameras, it is clear that the obstacle 730 may also be a visual obstacle as the obstacle 730 would block the view of the camera as well as the motion of the robot 600.

The obstacle 740 may be recognised from its size and shape as one that prevents the passage of the robots 600; however, it may also be low enough that the field of view of a camera associated with a robot 600 is not significantly impacted.

The obstacle 750 may be small enough that a robot 600 is able to mount the obstacle 750 and move past it; this may require special motion, or simply slow down the robot 600. Such a low obstacle will also have little effect on the images captured by a robot 600 that is provided with a camera.

In view of the differences described above, the obstacles may restrict the operation of the robots 600 in one or more ways. In order to enhance the immersiveness of the user experience when using virtual robots 720, it may be advantageous to identify the restrictions relating to corresponding 'real' robots 600 (where the word 'real' is used to indicate that the robot 600 is present in the real-world environment, as opposed to a virtual object which is not) so as to modify the behaviour of the virtual robots 720. For example, if an obstacle is identified that a real robot 600 cannot pass then it may be appropriate to prevent a virtual robot 720 from passing that same obstacle, and similarly the field of view of the virtual robot 720 should be restricted correspondingly.

The display 760 is shown here as being a television or the like; however, in some embodiments the display 760 may be provided as a head-mountable display (HMD). In some embodiments, both display devices may be utilised in combination, and indeed further HMDs may be provided such that a plurality of users are each able to use respective HMDs to view content.

The camera 770 may be used to assist in tracking the robots 600, in addition to being able to map the environment 700 and/or capture images of the environment 700 for display that may have virtual objects superimposed. Mapping the environment 700 may comprise identifying an interaction area 710 (either pre-defined or based upon current robot 600 position, for example) and identifying the position and shape/size of obstacles (such as those 730, 740 and 750 shown in FIG. 7).

In order to provide virtual robots 720, a processing device such as a personal computer or games console should be provided so as to generate and control the robots 720. As noted above, this device may be operable to generate corresponding images for display that show the operation of the robots 720. For example, images may be generated that show the real environment with the robots 720 superimposed.

Alternatively, or in addition, a virtual environment may be generated that displays models replacing one or more of the robots 600 and obstacles 730-750; this may be used to enhance or otherwise modify the appearance of real-world objects in displayed images. A mixed approach may be implemented in some embodiments, such that portions of the displayed content comprise camera images (with or without superimposed images) and portions comprise images of a virtual environment, This is an example of the processing device being operable to generate virtual objects in the virtual environment that represent the one or more real robots 600, and the processing device being operable to identify non-robot objects (such as the obstacles 730-750) in the real environment and to generate corresponding virtual objects in the virtual environment.

In some embodiments, a simple robot such as the robot 600 of FIG. 6 may be replaced in a generated image with a model of a humanoid character. That character may or may not be robotic, and of course may be any other shape; it should be understood that the virtual representation need not be limited by the physical shape of the robot 600 or the capabilities of that robot. For example, a model without wheels may be used to represent a robot that does have wheels—as long as the motion of the virtual and real objects may approximate one another, the respective features that provide this motion (or appear to, in the case of a virtual object) do not matter. It may be the case that the robot 600 is replaced with models of several different figures—for example, a single robot 600 may be replaced with the image of a group of soldiers in formation.

It is envisaged that in embodiments of the present invention the real robots 600 and the virtual robots 720 are able to interact with one another. Of course, such an interaction may not be physical as the virtual robots 720 have no physical presence. In this case, the interaction is in the virtual environment that is generated by the processing device. This interaction may be based upon the real-world position of the real robots 600, and indeed the position of the robots 600 in the virtual environment should be dependent upon the real-world position.

Possible examples of interactions between the real robots 600 and virtual robots 720 may include collisions (such as in a racing game), combat (such as in a fighting game), or an exchange of items (such as in a role-playing game or the like). The real robot 600 may be controlled so as to reflect such an interaction; for example, during a collision the speed of the robot 600 in the real environment may be modified in addition to a change of direction of motion being applied, while in combat if the robot (or corresponding virtual object) is beaten the robot 600 may become inoperable.

In some examples, the robot 600 may be a modular device such that components may be added or removed as desired. In such a case, individual components of the robot 600 may be discarded in response to interactions with the virtual robots 720.

The interactions here have been described as occurring between real robots 600 and virtual robots 720; however, interactions between only virtual robots 720, and interactions between only real robots 600, may also occur. These interactions may comprise any number and combination of real robots 600 and virtual robots 720 as appropriate.

These interactions are often dependent upon at least the positions of the one or more real robots in the real environment and the positions of the one or more virtual robots in the virtual environment; for example, in determining whether there has been a collision or whether a shot has been accurate it may be useful to determine the relative locations of real and virtual objects. This may be achieved by using a shared coordinate system for the real and virtual environments, for example, or by translating positions in one environment into the coordinate system of the other so as to be able to meaningfully compare the locations of real and virtual objects. Of course, any other suitable method for comparing the positions may also be utilised.

It should be noted that interactions between real robots 600 need not be limited to those that occur physically; the interactions themselves may be virtual (such as a first real robot 600 firing a virtual weapon at a second real robot 600), and the real robots 600 may react accordingly (for example, by preventing further motion of the second real robot 600 if it is 'killed' by the virtual weapon).

One or more of both the real robots 600 and virtual robots 720 may be user-controlled, for example using a controller or other input device. Alternatively, or in addition, the motion may be controlled by a corresponding computer program being executed by the processing device. Hence for example, if the user controls a real robot, then any other real robots and the virtual robots are indirectly responsive under the control of the processing device. Conversely, if the user controls a virtual robot, then any other virtual robots and the real robots are indirectly responsive under the control of the processing device.

In the example of FIG. 7 it is considered that the camera 770 is used to capture an image of the real environment 700 and that images are generated using the captured image, for example either by superimposing virtual objects upon the scene, or using this to gather position information of objects (such as robots 600 and obstacles) to be used when generating a virtual environment. However, it is also considered that other viewpoints may be used. For example, a virtual scene may be generated from any angle using the collected data.

Alternatively, or in addition, in some embodiments one or more robots 600 are provided with cameras; these may be used to capture images that may be displayed to a user with superimposed objects (such as virtual robots 720). This may enable a user to experience a first-person view of the interactions between the real robots 600 and the virtual robots 720.

Figure 8:
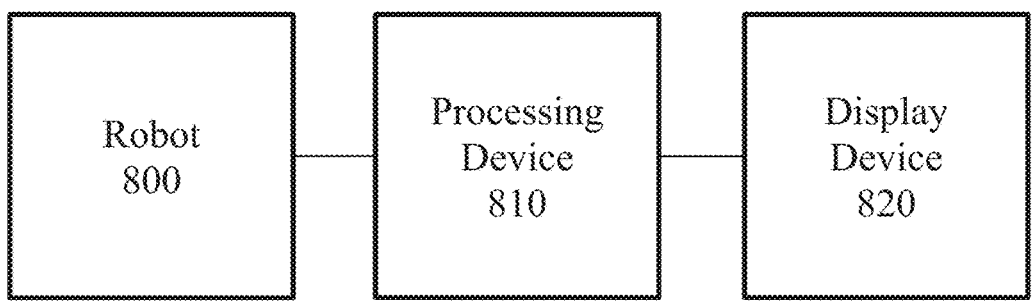
FIG. 8 schematically illustrates a system for controlling interactions between a plurality of real and virtual robots.

FIG. 8 schematically illustrates a system for controlling interactions between a plurality of real and virtual robots. This system comprises one or more robots 800, a processing device 810 and a display device 820.

The robots 800 may comprise any number of real and/or virtual robots (such as the real robots 600 and virtual robots 720 described above). In many embodiments, it is considered that at least one of each should be provided in order for the advantages of the presently disclosed arrangement to be observed. It is considered that one or more of the real and/or virtual robots are controlled by user input, although this is not essential.

The processing device 810 is operable to control interactions between one or more of the real robots and one or more of the virtual robots. The interactions between the real and virtual robots are generally dependent upon at least the positions of the one or more real robots in the real environment and the positions of the one or more virtual robots in the virtual environment. In some embodiments, as shown in FIG. 7, a camera, associated with the processing device and operable to capture images of the real environment, is provided.

The display device 820 is operable to display one or more virtual robots to a user, for example using images generated by the processing device 810. As noted above, this may be using a projector, a display screen such as a television, or an HMD, for example. In some embodiments, the display device is operable to display images of the real environment with virtual robots and objects superimposed. Alternatively, or in addition, the display device may be operable to display images of a virtual environment in which real robots are represented by virtual avatars; the avatars may represent the robots 600 as they appear in the real environment, or they may take an entirely different form as discussed above.

Figure 9:
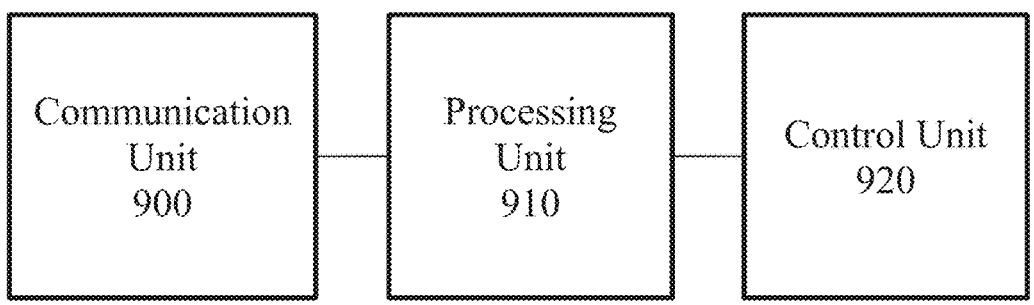
FIG. 9 schematically illustrates a processing device.

FIG. 9 schematically illustrates the processing device 810; this may be a games console or other information processing device. The processing device 810 comprises a communication unit 900, a processing unit 910 and a control unit 920.

The communication unit 900 is operable to perform communication with the real robots 600 (that is, those of the robots 800 that are present in the real environment). The communication unit 900 may comprise any suitable components for wired or wireless communication, such as a Wi-Fi transceiver.

The processing unit 910 is operable to perform any required processing to implement the system; for example, this may comprise performing processing to generate the virtual robots and to generate images containing these virtual robots.

The control unit 920 is operable to generate control signals for the robots 800. In some embodiments, control signals are generated only for the real robots 600, while in other embodiments signals may also be generated for the virtual robots 720. In such embodiments, it may be the case that the control unit 920 is not able to differentiate between the real robots 600 and virtual robots 720 and the processing unit 910 may be operable to implement the control signals as appropriate. In either case, it is considered that the control unit 920 should be operable generate instructions to modify the behaviour of one or more real robots 600 in response to an interaction with a virtual robot 720.

In some embodiments the control unit 920 may be operable to control interactions between virtual robots and the virtual objects in dependence upon an expected interaction between a real robot and the corresponding real object; this is discussed above with reference to the interactions between real robots 600 and obstacles 730-750, for example.

Figure 10:
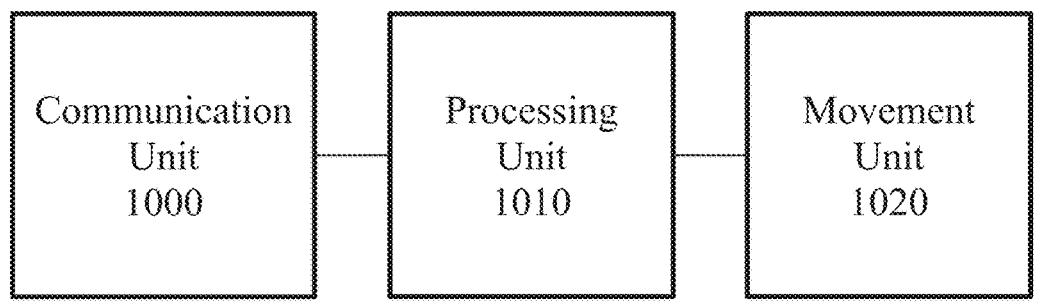
FIG. 10 schematically illustrates a robot.

FIG. 10 schematically illustrates a robot 800 comprising a communication unit 1000, a processing unit 1010 and a movement unit 1020. As noted above, various other components and features may be provided in addition to those shown in FIG. 10. This structure may be applied to both real robots 600 and virtual robots 720, although of course in the latter case the components would be virtual and instead implemented by the processing device 810.

The communication unit 1000 is operable to enable communications between the robot 800 and the processing device 810, such as control instructions and/or position data measured by the robot 800. Alternatively, or in addition, the communication unit 1000 is operable to communicate with others of the robots 800; in some examples, control instructions for each of the real robots 600 may be communicated to a single one of the robots 600 before being distributed to others of the robots 600 by that single robot 600.

The processing unit 1010 is operable to interpret and implement any instructions received via the communication unit 1000, in addition to performing any additional processing that may be performed by the robot 800. For example, this may comprise determining a location of the robot 800 using sensor data or processing captured video data from an associated camera.

The movement unit 1020 may comprise any suitable locomotive components (such as wheels, tracks or legs) in addition to any control units that may be required to identify the control to be performed in response to received instructions.

Figure 11:
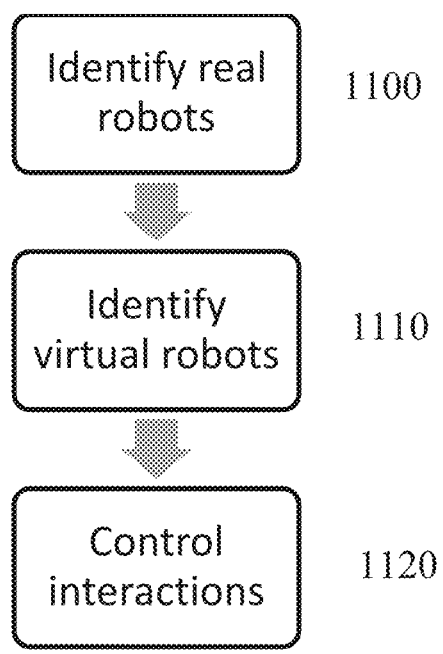
FIG. 11 schematically illustrates a method for controlling interactions between a plurality of real and virtual robots.

FIG. 11 schematically illustrates a method for controlling interactions between a plurality of real and virtual robots in a system comprising one or more real robots present in the real environment and one or more virtual robots present in a virtual environment corresponding to the real environment.

A step 1100 comprises identifying one or more real robots 600 present in the real environment; this step may also comprise identifying the corresponding position of one or more of the identified robots and/or the functionality of each of the identified robots.

A step 1110 comprises identifying one or more virtual robots 720 present in the virtual environment; this step may also comprise identifying the corresponding position of one or more of the identified robots in the virtual environment and/or the functionality of each of the identified robots.

A step 1120 comprises controlling, with a processing device, interactions between one or more of the real robots and one or more of the virtual robots, wherein the interactions between the real and virtual robots are dependent upon at least the positions of the one or more real robots in the real environment and the positions of the one or more virtual robots in the virtual environment.

By implementing an arrangement according to the above disclosure, it is possible that a user is able to supplement a supply of real robots with virtual robots that can act as allies or opponents for those real robots. In this way, desirable interactions may be provided for a user even when their supply of real robots is small.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for controlling interactions between a plurality of real and virtual robots, the system comprising:
   one or more real robots present in a real environment;
   one or more virtual robots present in a virtual environment corresponding to the real environment; and
   a processing device operable to control interactions between one or more of the real robots and one or more of the virtual robots,
   wherein the interactions between the real and virtual robots are dependent upon at least the positions of the one or more real robots in the real environment and the positions of the one or more virtual robots in the virtual environment,
   wherein one or more of the real and/or virtual robots are controlled by user input, and
   wherein the processing device accesses a resultant state of the one or more real robots controlled by the user, to determine at least one of: (i) how such one or more real robots are to interact with the virtual environment, and (ii) how the virtual environment responds to such one or more real robots.

2. A system according to claim 1, wherein the processing device is operable to generate virtual objects in the virtual environment that represent the one or more real robots.

3. A system according to claim 1, wherein the processing device is operable to identify non-robot objects in the real environment and to generate corresponding virtual objects in the virtual environment.

4. A system according to claim 3, wherein the processing device is operable to control interactions between virtual robots and the virtual objects in dependence upon an expected interaction between a real robot and the corresponding real object.

5. A system according to claim 1, wherein the processing device is operable to modify the behaviour of one or more real robots in response to an interaction with a virtual robot.

6. A system according to claim 1, comprising a display device operable to display one or more virtual robots to a user.

7. A system according to claim 6, wherein the display device is operable to display images of the real environment with virtual robots and objects superimposed.

8. A system according to claim 6, wherein the display device is operable to display images of a virtual environment in which real robots are represented by virtual avatars.

9. A system according to claim 1 comprising a camera, associated with the processing device, operable to capture images of the real environment.

10. A system according to claim 1, wherein one or more of the real robots comprises a camera operable to capture images of the real environment.

11. A system according to claim 1, wherein the real environment comprises an inductive charging loop operable to provide electrical power to the real robots.

12. A system according to claim 1, wherein the interactions between the one or more real robots and the corresponding one or more virtual robots include that at least one of:
   one or more actions of the one or more real robots is monitored by the processing device such that such one or more actions in the real environment are mirrored by one or more corresponding actions of the one or more virtual robots in the virtual environment, and vice versa;
   one or more actions of the one or more virtual robots caused by a user of the system through the user input to the processing device is used by the processing device to control one or more corresponding actions of the one or more real robots;
   sensor data obtained in the real environment regarding one or more actions of the one or more real robots is used by the processing device to control one or more corresponding actions of the one or more virtual robots in the virtual environment;
   the one or more actions of the one or more real robots caused by the user through the user input is reflected in the sensor data, and is used by the processing device to control the one or more corresponding actions of the one or more virtual robots; and
   the one or more actions of the one or more real robots caused by the user through the user input is achieved through the user manipulating a dedicated interface for the one or more real robots;
   the one or more actions of the one or more real robots caused by the user through the user input to achieved through the user directly physically manipulating the one or more real robots.

13. A method for controlling interactions between a plurality of real and virtual robots in a system comprising one or more real robots present in a real environment and one or more virtual robots present in a virtual environment corresponding to the real environment, the method comprising:
   controlling, with a processing device, interactions between one or more of the real robots and one or more of the virtual robots,
   wherein the interactions between the real and virtual robots are dependent upon at least the positions of the one or more real robots in the real environment and the positions of the one or more virtual robots in the virtual environment,
   wherein one or more of the real and/or virtual robots are controlled by user input, and wherein the controlling includes accessing a resultant state of the one or more real robots controlled by the user, to determine at least one of: (i) how such one or more real robots are to interact with the virtual environment, and (ii) how the virtual environment responds to such one or more real robots.

14. A non-transitory machine-readable storage medium which stores computer software, which when executed by a computer, causes the computer to carry out actions for controlling interactions between a plurality of real and virtual robots in a system including one or more real robots present in a real environment and one or more virtual robots present in a virtual environment corresponding to the real environment, the actions comprising:

controlling, with a processing device, interactions between one or more of the real robots and one or more of the virtual robots, wherein the interactions between the real and virtual robots are dependent upon at least the positions of the one or more real robots in the real environment and the positions of the one or more virtual robots in the virtual environment, wherein one or more of the real and/or virtual robots are controlled by user input, and wherein the controlling includes accessing a resultant state of the one or more real robots controlled by the user, to determine at least one of: (i) how such one or more real robots are to interact with the virtual environment, and (ii) how the virtual environment responds to such one or more real robots.

\* \* \* \* \*